(12) United States Patent
Keane et al.

(10) Patent No.: US 9,230,368 B2
(45) Date of Patent: Jan. 5, 2016

(54) HOLOGRAM ANCHORING AND DYNAMIC POSITIONING

(71) Applicant: Microsoft Technology Licensing, LLC, Redmond, WA (US)

(72) Inventors: Brian E. Keane, Bellevue, WA (US); Ben J. Sugden, Woodinville, WA (US); Robert L. Crocco, Jr., Seattle, WA (US); Daniel Deptford, Redmond, WA (US); Tom G. Salter, Seattle, WA (US); Laura K. Massey, Redmond, WA (US); Alex Aben-Athar Kipman, Redmond, WA (US); Peter Tobias Kinnebrew, Seattle, WA (US); Nicholas Ferianc Kamuda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 13/901,342

(22) Filed: May 23, 2013

(65) Prior Publication Data

US 2014/0347391 A1   Nov. 27, 2014

(51) Int. Cl.
*G06T 19/00* (2011.01)
*G06F 3/0487* (2013.01)
*G06F 3/01* (2006.01)
*G06F 3/0481* (2013.01)

(52) U.S. Cl.
CPC .............. *G06T 19/006* (2013.01); *G06F 3/011* (2013.01); *G06F 3/0487* (2013.01); *G06F 3/04815* (2013.01)

(58) Field of Classification Search
CPC ..................................................... G06T 19/006
See application file for complete search history.

(56) References Cited

U.S. PATENT DOCUMENTS

| 6,031,519 | A | 2/2000 | O'Brien |
| 2009/0102603 | A1 | 4/2009 | Fein et al. |
| 2010/0097439 | A1 | 4/2010 | Kroll et al. |
| 2011/0261427 | A1 | 10/2011 | Hart et al. |
| 2012/0105473 | A1 | 5/2012 | Bar-Zeev et al. |
| 2012/0127284 | A1* | 5/2012 | Bar-Zeev et al. ............... 348/53 |
| 2012/0206485 | A1 | 8/2012 | Osterhout et al. |
| 2012/0249741 | A1* | 10/2012 | Maciocci et al. ............... 348/46 |
| 2013/0328925 | A1 | 12/2013 | Latta et al. |

OTHER PUBLICATIONS

Fairhead, Harry, "Kinect 3D Full Body "Hologram"", Published on: May 5, 2012, 3 pages Available at: http://www.i-programmer.info/news/91-hardware/4177-kinect-3d-full-body-hologram.html.
Plesniak, et al., "Haptic Holography: A Primitive Computational Plastic", In Proceedings of the IEEE, Sep. 2003, 14 pages.
(Continued)

*Primary Examiner* — Jeffery A Brier
(74) *Attorney, Agent, or Firm* — Dan Choi; Judy Yee; Micky Minhas

(57) ABSTRACT

A system and method are disclosed for displaying virtual objects in a mixed reality environment in a way that is optimal and most comfortable for a user to interact with the virtual objects. When a user is moving through the mixed reality environment, the virtual objects may remain world-locked, so that the user can move around and explore the virtual objects from different perspectives. When the user is motionless in the mixed reality environment, the virtual objects may rotate to face the user so that the user can easily view and interact with the virtual objects.

20 Claims, 13 Drawing Sheets

(56) References Cited

OTHER PUBLICATIONS

Patently Apple, "Apple Working on 3D Holographic Projection Displays", Published on: Mar. 20, 2008, 9 pages Available at: http://www.patentlyapple.com/patently-apple/2008/03/apple-working-on-3d-holographic-projection-displays.html.
"International Search Report & Written Opinion for PCT Patent Application No. PCT/US2014/039050", Mailed Date: Sep. 16, 2014, 12 Pages (MS# 337455.02).
Cayley, et al. "The Practice and Poetics of Writing in Inmersive VR (A Case Study with Maquette)", in Leonardo Electronic Almanac (LEA), vol. 14, Issue 5-6, Sep. 1, 2006, 19 Pages.
Magerkurth, et al. "Towards the Next Generation of Tabletop Gaming Experiences", In Proceedings of Graphics Interface, May 2004, pp. 73-80.
Written Opinion of the International Preliminary Examning Authority dated May 18, 2005 in PCT Patent Application No. PCT/US2014/039050.
Billinghurst, et al. "Adding Intelligence to the Interface", Proceedings of VRAIS '96, Mar. 30, 1996, pp. 168-175.
"International Preliminary Report on Patentability Issued in PCT Patent Application No. PCT/US2014/039050", Mailed Date: Sep. 10, 2015, 11 pages.

* cited by examiner

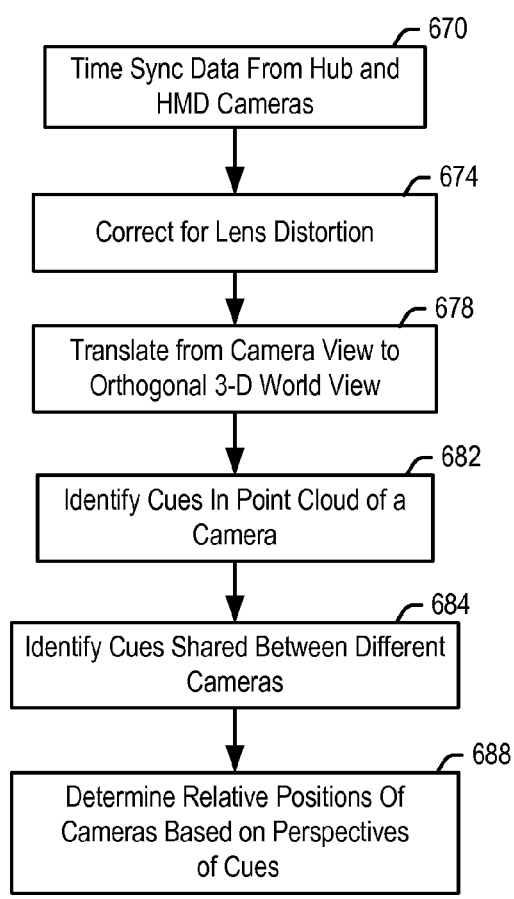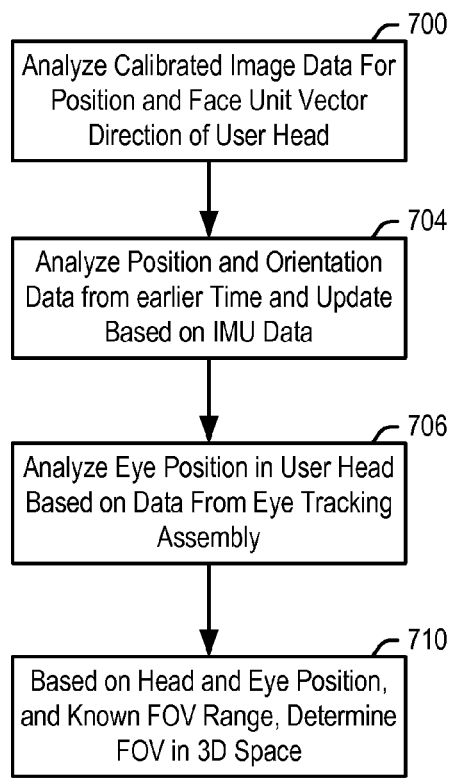

(Step 618)

*(Step 646)*

*(Step 812)*

HOLOGRAM ANCHORING AND DYNAMIC POSITIONING

BACKGROUND

Mixed reality is a technology that allows virtual imagery to be mixed with a real world physical environment. A see-through, head mounted, mixed reality display device may be worn by a user to view the mixed imagery of real objects and virtual objects displayed in the user's field of view. A user may further interact with virtual objects, for example by performing hand, head or voice gestures to move the objects, alter their appearance or simply view them. As a user moves around within a physical environment, the user's position relative to the virtual objects changes. This provides a sense of perspective of the user relative to a virtual object, but it often makes it difficult to view or interact with virtual objects from off-angles.

SUMMARY

Embodiments of the present technology relate to a system and method for anchoring positions of virtual objects, also referred to as holograms, as a user moves around in a mixed reality environment, and for repositioning virtual objects when a user is motionless in a way that is optimal and most comfortable for a user to view and/or interact with the virtual objects. A system for creating a mixed reality environment in general includes a see-through, head mounted display device coupled to one or more processing units. The processing units in cooperation with the head mounted display unit(s) are able to determine when a user is moving or stationary, as well as the user's position, including head position, relative to the virtual objects in the environment.

Using this information, the mixed reality system is able to anchor positions of virtual objects in the environment when a user is moving around in the environment. This allows a user to move around virtual objects, view them from different perspectives, and gain a full appreciation of the orientation and spacing of the virtual objects from the user. When a user stands still, for example for a predetermined period of time, the system is able to reposition virtual objects to face the user and/or move to user-defined positions that are optimal for viewing and/or interaction. Virtual objects may take any form such as animate or inanimate objects. A subset of virtual object is a virtual display slate, which may include a virtual display of text, graphics, photographs or video.

In an example, the present technology relates to a system for presenting a mixed reality experience to one or more users, the system comprising: one or more display devices for the one or more users, each display device including a display unit for displaying a virtual object to the user of the display device; and a computing system operatively coupled to the one or more display devices, the computing system generating the virtual object for display on the one or more display devices, the computing system displaying the virtual object to a user of the one or more users at a first position when the user is moving, and the computing system displaying the virtual object to the user at a second position rotated to face the user when the user is motionless.

In a further example, the present technology relates to a system for presenting a mixed reality experience to a user, the system comprising: a display device for the user, the display device including a first set of sensors for sensing data relating to a position of the display device and a display unit for displaying a virtual object to the user of the display device; and a computing system operatively coupled to the display device, the computing system including a second set of sensors for sensing data relating to a position of the user, and the computing system generating the virtual object for display on the display device, the computing system displaying the virtual object to the user as rotating to face the user when the user changes their movement from being in motion to being motionless for a predetermined period of time.

In another example, the present technology relates to a method of presenting a mixed reality experience to one or more users, the method comprising: (a) displaying a virtual object to the user at a first position in the user's field of view when it is determined that the user is moving with respect to the virtual object; and (b) rotating the virtual object to a second position to face the user when it is determined that the user is motionless for a predetermined period of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 10-14A are more detailed flowcharts of examples of various steps shown in the flowchart of FIG. 10.

DETAILED DESCRIPTION

Figure 1:
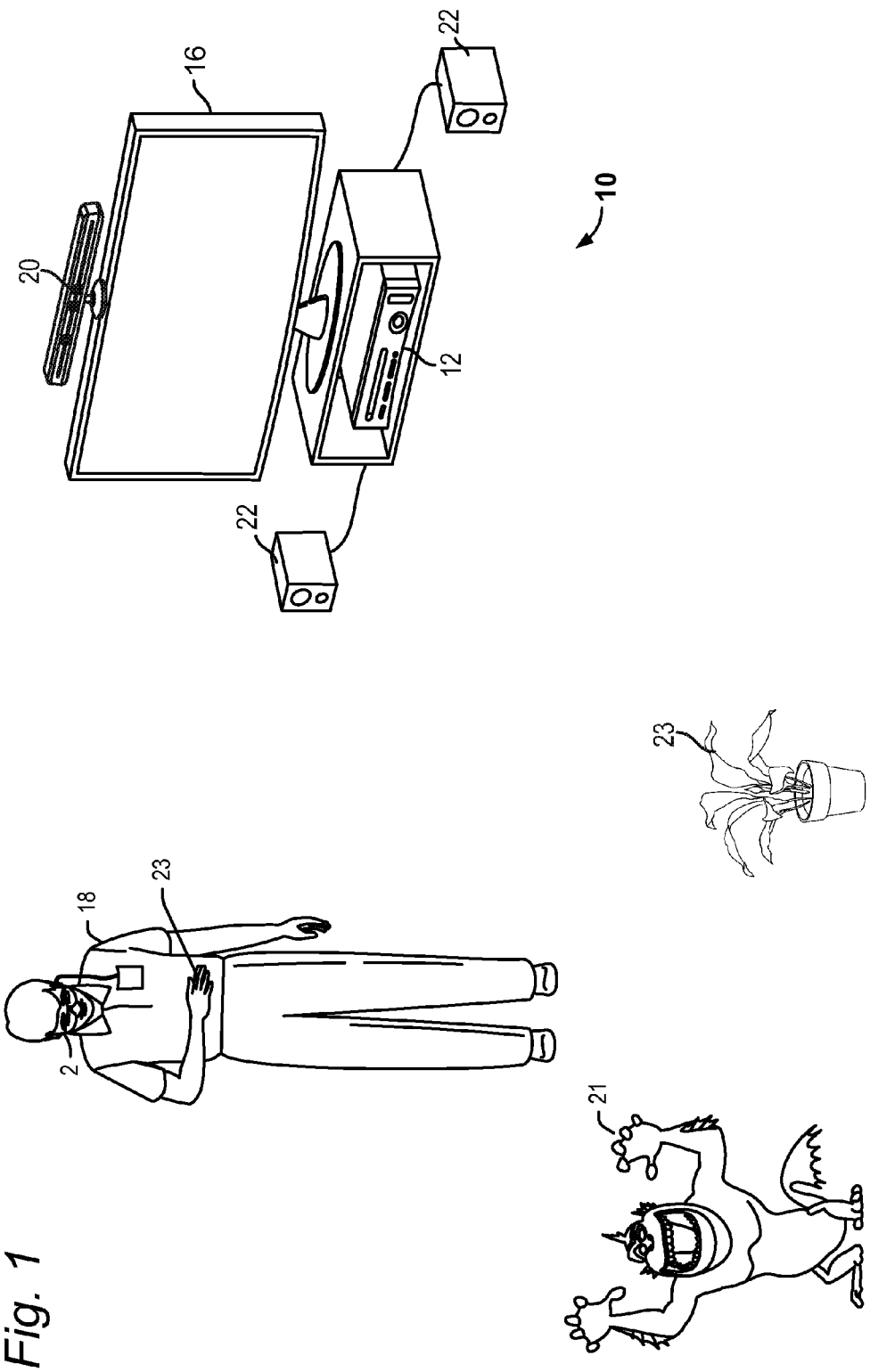
FIG. 1 is an illustration of example components of one embodiment of a system for presenting a mixed reality environment to one or more users.

Embodiments of the present technology will now be described with reference to FIGS. 1-14A, which in general relate to a mixed reality environment wherein positions of one or more virtual objects may remain stationary as a user moves around in the mixed reality environment, but change to allow optimal viewing and/or interaction with the one or more virtual objects when the user is stationary. The system for implementing the mixed reality environment may include a mobile display device communicating with a hub computing system. The mobile display device may include a mobile processing unit coupled to a head mounted display device (or other suitable apparatus).

A head mounted display device may include a display element. The display element is to a degree transparent so that a user can look through the display element at real world objects within the user's field of view (FOV). The display element also provides the ability to project virtual images into the FOV of the user such that the virtual images may also appear alongside the real world objects. The system automatically tracks where the user is looking so that the system can determine where to insert the virtual image in the FOV of the user. Once the system knows where to project the virtual image, the image is projected using the display element.

In embodiments, the hub computing system and one or more of the processing units may cooperate to build a model of the environment including the x, y, z Cartesian positions of all users, real world objects and virtual three-dimensional objects in the room or other environment. The positions of each head mounted display device worn by the users in the environment may be calibrated to the model of the environment and to each other. This allows the system to determine each user's line of sight and FOV of the environment. Thus, a virtual image may be displayed to each user, but the system determines the display of the virtual image from each user's perspective, adjusting the virtual image for parallax and any occlusions from or by other objects in the environment. The model of the environment, referred to herein as a scene map, as well as all tracking of the user's FOV and objects in the environment may be generated by the hub and mobile processing unit working in tandem or individually.

A user may choose to interact with one or more of the virtual objects appearing within the user's FOV. As used herein, the term "interact" encompasses both physical interaction and verbal interaction of a user with a virtual object. Physical interaction includes a user performing a predefined gesture using his or her fingers, hand, head and/or other body part(s) recognized by the mixed reality system as a user-request for the system to perform a predefined action. Such predefined gestures may include but are not limited to pointing at, grabbing, and pushing virtual objects.

A user may also physically interact with a virtual object with his or her eyes. In some instances, eye gaze data identifies where a user is focusing in the FOV, and can thus identify that a user is looking at a particular virtual object. Sustained eye gaze, or a blink or blink sequence, may thus be a physical interaction whereby a user selects one or more virtual objects.

As used herein, a user simply looking at a virtual object, such as viewing content on a virtual display slate, is a further example of physical interaction of a user with a virtual object.

A user may alternatively or additionally interact with virtual objects using verbal gestures, such as for example a spoken word or phrase recognized by the mixed reality system as a user request for the system to perform a predefined action. Verbal gestures may be used in conjunction with physical gestures to interact with one or more virtual objects in the mixed reality environment.

As a user moves around within a mixed reality environment, virtual objects may remain world-locked. That is, they may remain anchored and stationary in the mixed reality environment so that a user can move around world-locked virtual objects and see them from different perspectives and distances. In accordance with the present technology, when a user stops moving or has nearly stopped moving, for example for a predetermined period of time, the positions of the virtual object(s) may switch to being body-locked to the user. That is, the positions of the virtual objects may be altered so as to face the user or move to some other predefined position relative to the user's body. As used herein, the term "position" encompasses both translational position with respect to a three-axis coordinate system, and rotational orientation (pitch, roll and/or yaw) about the axes of the coordinate system.

Embodiments are described below which optimize the positions of virtual objects such as a virtual display slate presenting content to a user. The content may be any content which can be displayed on the virtual slate, including for example static content such as text, pictures and photographs, or dynamic content such as video. However, it is understood that the present technology is not limited to the positioning of virtual display slates, and may reposition and/or resize any virtual objects provided within the mixed reality environment.

Figure 2:
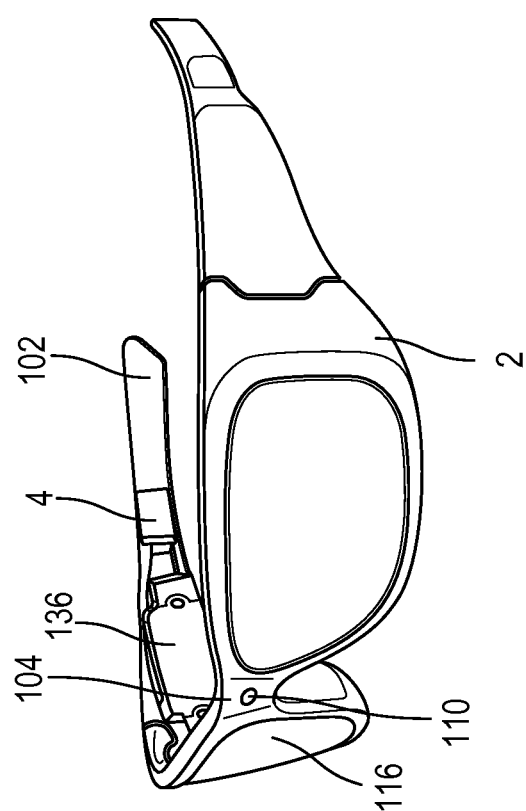
FIG. 2 is a perspective view of one embodiment of a head mounted display unit.
Figure 3:
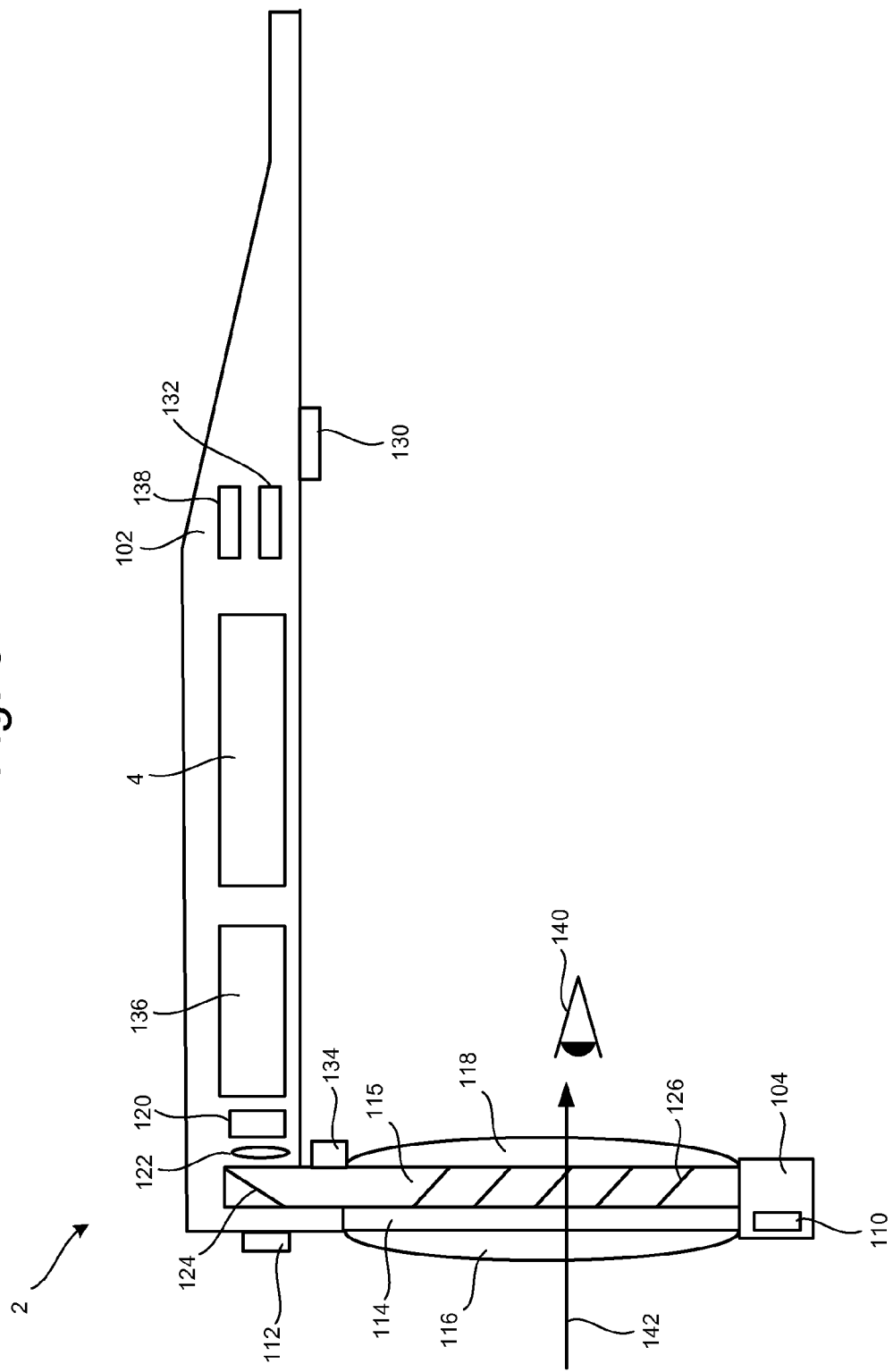
FIG. 3 is a side view of a portion of one embodiment of a head mounted display unit.

FIG. 1 illustrates a system 10 for providing a mixed reality experience by fusing virtual content 21 with real content 23 within a user's FOV. FIG. 1 shows a single user 18 wearing a head mounted display device 2, but it is understood that more than one user may be present in the mixed reality environment and viewing the same virtual objects from their own perspective. As seen in FIGS. 2 and 3, a head mounted display device 2 may include an integrated processing unit 4. In other embodiments, the processing unit 4 may be separate from the head mounted display device 2, and may communicate with the head mounted display device 2 via wired or wireless communication. Head mounted display device 2, which in one embodiment is in the shape of glasses, is worn on the head of a user so that the user can see through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

The processing unit 4 may include much of the computing power used to operate head mounted display device 2. In embodiments, the processing unit 4 communicates wirelessly (e.g., WiFi, Bluetooth, infra-red, or other wireless communication means) to one or more hub computing systems 12. As explained hereinafter, hub computing system 12 may be provided remotely from the processing unit 4, so that the hub computing system 12 and processing unit 4 communicate via a wireless network such as a LAN or WAN. In further embodiments, the hub computing system 12 may be omitted to provide a completely mobile mixed reality experience using only the head mounted display devices 2 and processing units 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes a capture device 20 for capturing image data from portions of a scene within its FOV. As used herein, a scene is the environment in which the users move around, which environment is captured within the FOV of the capture device 20 and/or the FOV of each head mounted display device 2. FIG. 1 shows a single capture device 20, but there may be multiple capture devices in further embodiments which cooperate to collectively capture image data from a scene within the composite FOVs of the multiple capture devices 20. Capture device 20 may include one or more cameras that visually monitor the user 18 and the surrounding space such that gestures and/or movements performed by the user, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, a component video cable, RCA cables, etc. In one example, audiovisual device 16 includes internal speakers. In other embodiments, audiovisual device 16 and hub computing system 12 may be connected to external speakers 22.

The hub computing system 12, together with the head mounted display device 2 and processing unit 4, may provide a mixed reality experience where one or more virtual images, such as virtual image 21 in FIG. 1, may be mixed together with real world objects in a scene. FIG. 1 illustrates examples of a plant 23 or a user's hand 23 as real world objects appearing within the user's FOV.

FIGS. 2 and 3 show perspective and side views of the head mounted display device 2. FIG. 3 shows the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside light-guide optical element 115. Opacity filter 114 filters out natural light (either on a per pixel basis or uniformly) to enhance the contrast of the virtual imagery. Light-guide optical element 115 channels artificial light to the eye. More details of opacity filter 114 and light-guide optical element 115 are provided below.

Mounted to or inside temple 102 is an image source, which (in one embodiment) includes microdisplay 120 for projecting a virtual image and lens 122 for directing images from microdisplay 120 into light-guide optical element 115. In one embodiment, lens 122 is a collimating lens.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. In one embodiment, each eye will have its own light-guide optical element 115. When the head mounted display device 2 has two light-guide optical elements, each eye can have its own microdisplay 120 that can display the same image in both eyes or different images in the two eyes. In another embodiment, there can be one light-guide optical element which reflects light into both eyes.

Opacity filter 114, which is aligned with light-guide optical element 115, selectively blocks natural light, either uniformly or on a per-pixel basis, from passing through light-guide optical element 115. However, in general, an embodiment of the opacity filter 114 can be a see-through LCD panel, an electrochromic film, or similar device which is capable of serving as an opacity filter. Opacity filter 114 can include a dense grid of pixels, where the light transmissivity of each pixel is individually controllable between minimum and maximum transmissivities. While a transmissivity range of 0-100% is ideal, more limited ranges are also acceptable, such as for example about 50% to 90% per pixel, up to the resolution of the LCD.

A mask of alpha values can be used from a rendering pipeline, after z-buffering with proxies for real-world objects. When the system renders a scene for the augmented reality display, it takes note of which real-world objects are in front of which virtual objects as explained below. If a virtual object is in front of a real-world object, then the opacity may be on for the coverage area of the virtual object. If the virtual object is (virtually) behind a real-world object, then the opacity may be off, as well as any color for that pixel, so the user will see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide FOV.

Figure 4:
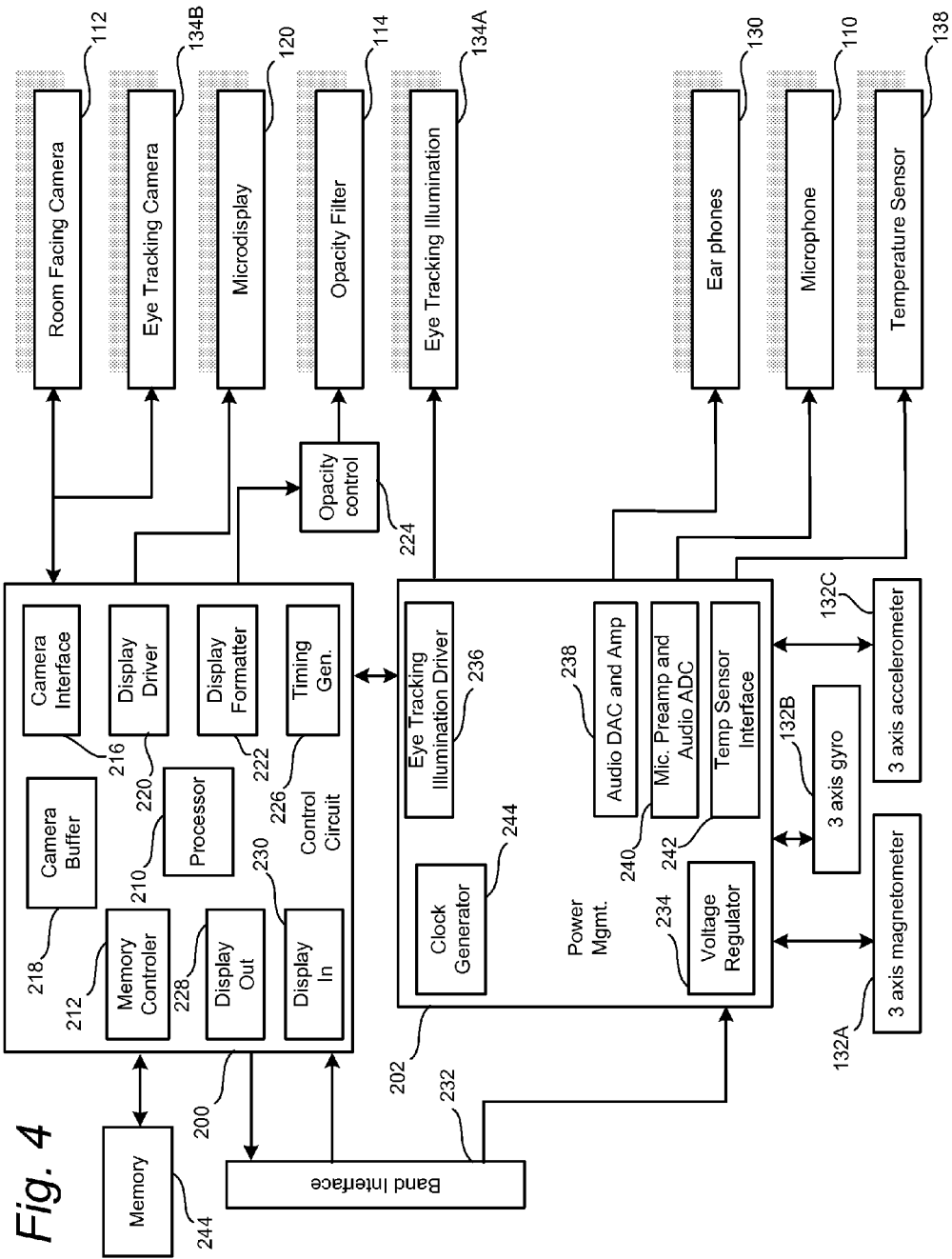
FIG. 4 is a block diagram of one embodiment of the components of a head mounted display unit.

Head mounted display device 2 also includes a system for tracking the position of the user's eyes. As will be explained below, the system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 2 includes eye tracking assembly 134 (FIG. 3), which has an eye tracking illumination device 134A and eye tracking camera 134B (FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3 only shows half of the head mounted display device 2. A full head mounted display device would include another set of see-through lenses, another opacity filter, another light-guide optical element, another microdisplay 120, another lens 122, room-facing camera, eye tracking assembly, micro display, earphones, and temperature sensor.

Figure 5:
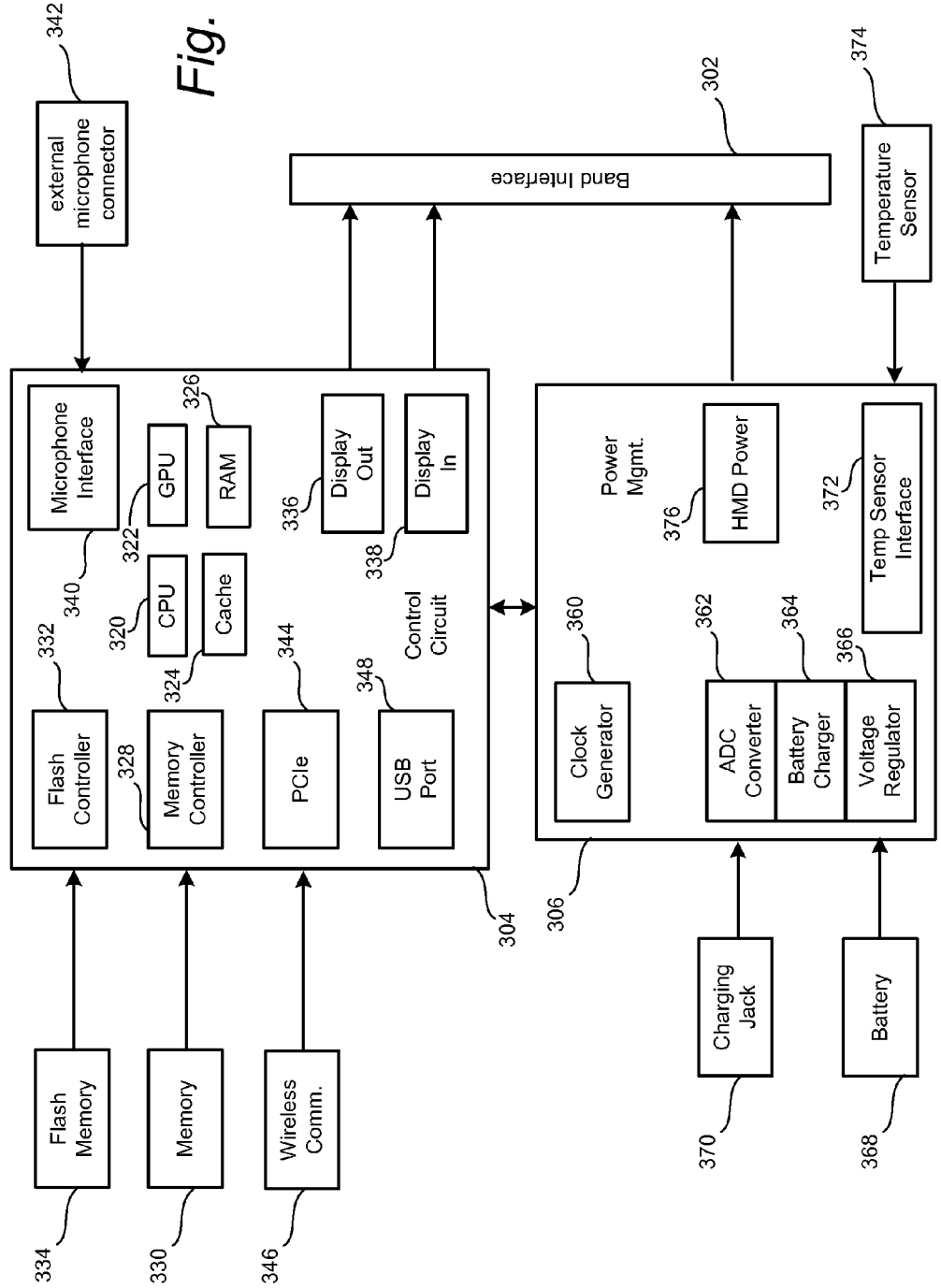
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a mixed reality experience to the user by fusing one or more virtual images seamlessly with the user's view of the real world. Additionally, the head mounted display device components of FIG. 4 include many sensors that track various conditions. Head mounted display device 2 will receive instructions about the virtual image from processing unit 4 and will provide the sensor information back to processing unit 4. Processing unit 4, the components of which are depicted in FIG. 4, will receive the sensory information from head mounted display device 2 and will exchange information and data with the hub computing system 12 (FIG. 1). Based on that exchange of information and data, processing unit 4 will determine where and when to provide a virtual image to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, all of the components of control circuit 200 are in communication with each other via dedicated lines or one or more buses. In another embodiment, each of the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, Blue-Tooth communication device, infrared communication device, etc. The USB port can be used to dock the processing unit 4 to hub computing system 12 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 6:
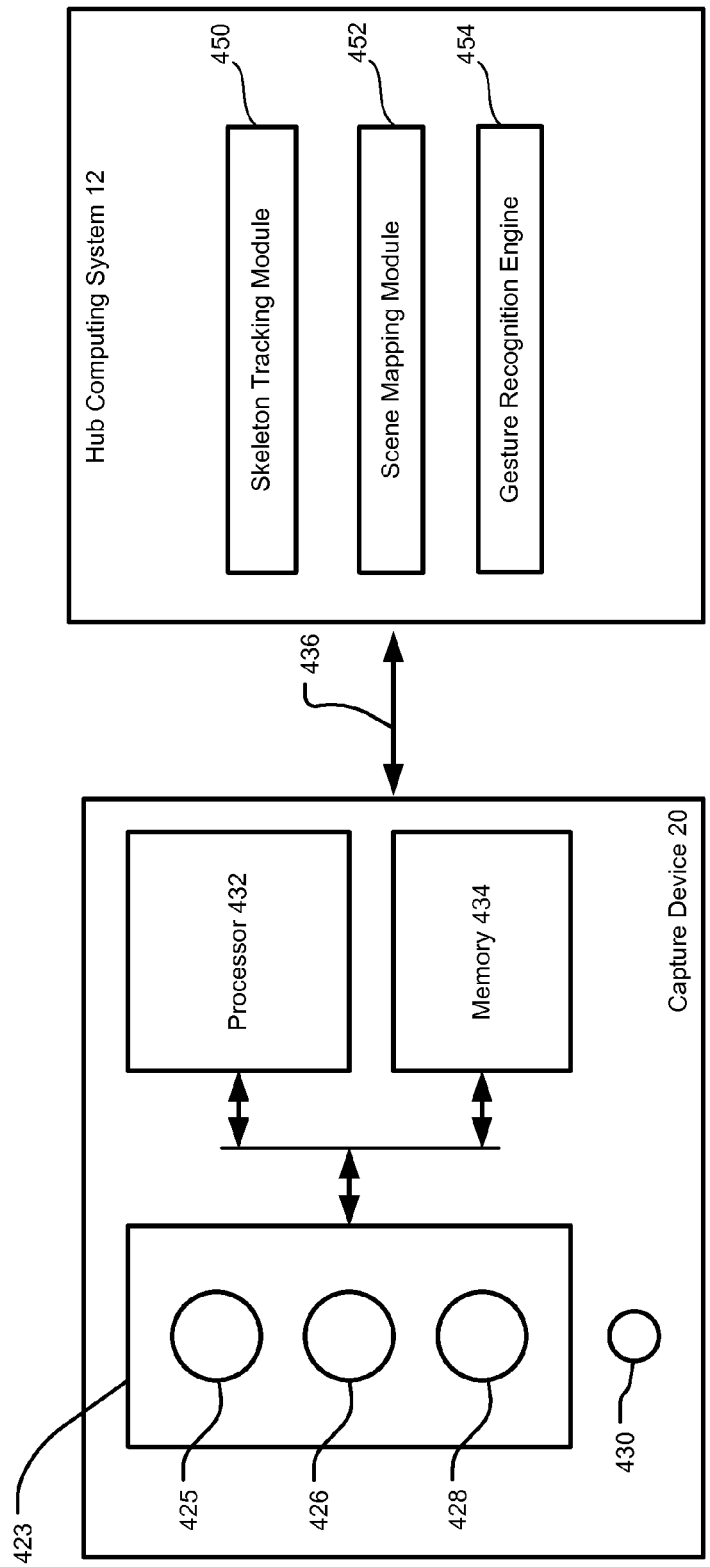
FIG. 6 is a block diagram of one embodiment of the components of a hub computing system used with head mounted display unit.

FIG. 6 illustrates an example embodiment of hub computing system 12 with a capture device 20. According to an example embodiment, capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 6, capture device 20 may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20 may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, capture device 20 may use a structured light to capture depth information. In such an analysis, patterned light (i.e., light displayed as a known pattern such as a grid pattern, a stripe pattern, or different pattern) may be projected onto the scene via, for example, the IR light component 425. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR light component 425 is displaced from the cameras 426 and 428 so triangulation can be used to determined distance from cameras 426 and 428. In some implementations, the capture device 20 will include a dedicated IR sensor to sense the IR light, or a sensor with an IR filter.

According to another embodiment, one or more capture devices 20 may include two or more physically separated cameras that may view a scene from different angles to obtain visual stereo data that may be resolved to generate depth information. Other types of depth image sensors can also be used to create a depth image.

The capture device 20 may further include a microphone 430, which includes a transducer or sensor that may receive and convert sound into an electrical signal. Microphone 430 may be used to receive audio signals that may also be provided to hub computing system 12.

In an example embodiment, the capture device 20 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 6, in one embodiment, memory 434 may be a separate component in communication with the image camera component 423 and processor 432. According to another embodiment, the memory 434 may be integrated into processor 432 and/or the image camera component 423.

Capture device 20 is in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20 that may be used to determine when to capture, for example, a scene via the communication link 436. Additionally, the capture device 20 provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 may include a skeletal tracking module 450. Module 450 uses the depth images obtained in each frame from capture device 20, and possibly from cameras on the one or more head mounted display devices 2, to develop a representative model of a user 18 (or others) within the FOV of capture device 20 as each user moves around in the scene. This representative model may be a skeletal model described below. Hub computing system 12 may further include a scene mapping module 452. Scene mapping module 452 uses depth and possibly RGB image data obtained from capture device 20, and possibly from cameras on the one or more head mounted display devices 2, to develop a map or model of the scene in which the user 18 exists. The scene map may further include the positions of the users obtained from the skeletal tracking module 450. The hub computing system may further include a gesture recognition engine 454 for receiving skeletal model data for one or more users in the scene and determining whether the user is performing a predefined gesture or application-control movement affecting an application running on hub computing system 12.

Capture device 20 provides RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as the distance of an object in the captured scene from the capture device. Hub computing system 12 will use the RGB images and depth images to develop a skeletal model of a user and to track a user's or other object's movements. There are many methods that can be used to model and track the skeleton of a person with depth images.

One such method includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for user modeling and tracking can also be used.

The above-described hub computing system 12, together with the head mounted display device 2 and processing unit 4, are able to insert a virtual three-dimensional object into the FOV of one or more users so that the virtual three-dimensional object augments and/or replaces the view of the real world. In one embodiment, head mounted display device 2, processing unit 4 and hub computing system 12 work together as each of the devices includes a subset of sensors that are used to obtain the data to determine where, when and how to insert the virtual three-dimensional object. In one embodiment, the calculations that determine where, when and how to insert a virtual three-dimensional object are performed by the hub computing system 12 and processing unit 4 working in tandem with each other. However, in further embodiments, all calculations may be performed by the hub computing system 12 working alone or the processing unit(s) 4 working alone. In other embodiments, at least some of the calculations can be performed by the head mounted display device 2.

In one example embodiment, hub computing system 12 and processing units 4 work together to create the scene map or model of the environment that the one or more users are in and track various moving objects in that environment. In addition, hub computing system 12 and/or processing unit 4 track the FOV of a head mounted display device 2 worn by a user 18 by tracking the position and orientation of the head mounted display device 2. Sensor information obtained by head mounted display device 2 is transmitted to processing unit 4. In one example, that information is transmitted to the hub computing system 12 which updates the scene model and transmits it back to the processing unit. The processing unit 4 then uses additional sensor information it receives from head mounted display device 2 to refine the FOV of the user and provide instructions to head mounted display device 2 on where, when and how to insert the virtual three-dimensional object. Based on sensor information from cameras in the capture device 20 and head mounted display device(s) 2, the scene model and the tracking information may be periodically updated between hub computing system 12 and processing unit 4 in a closed loop feedback system as explained below.

Figure 7:
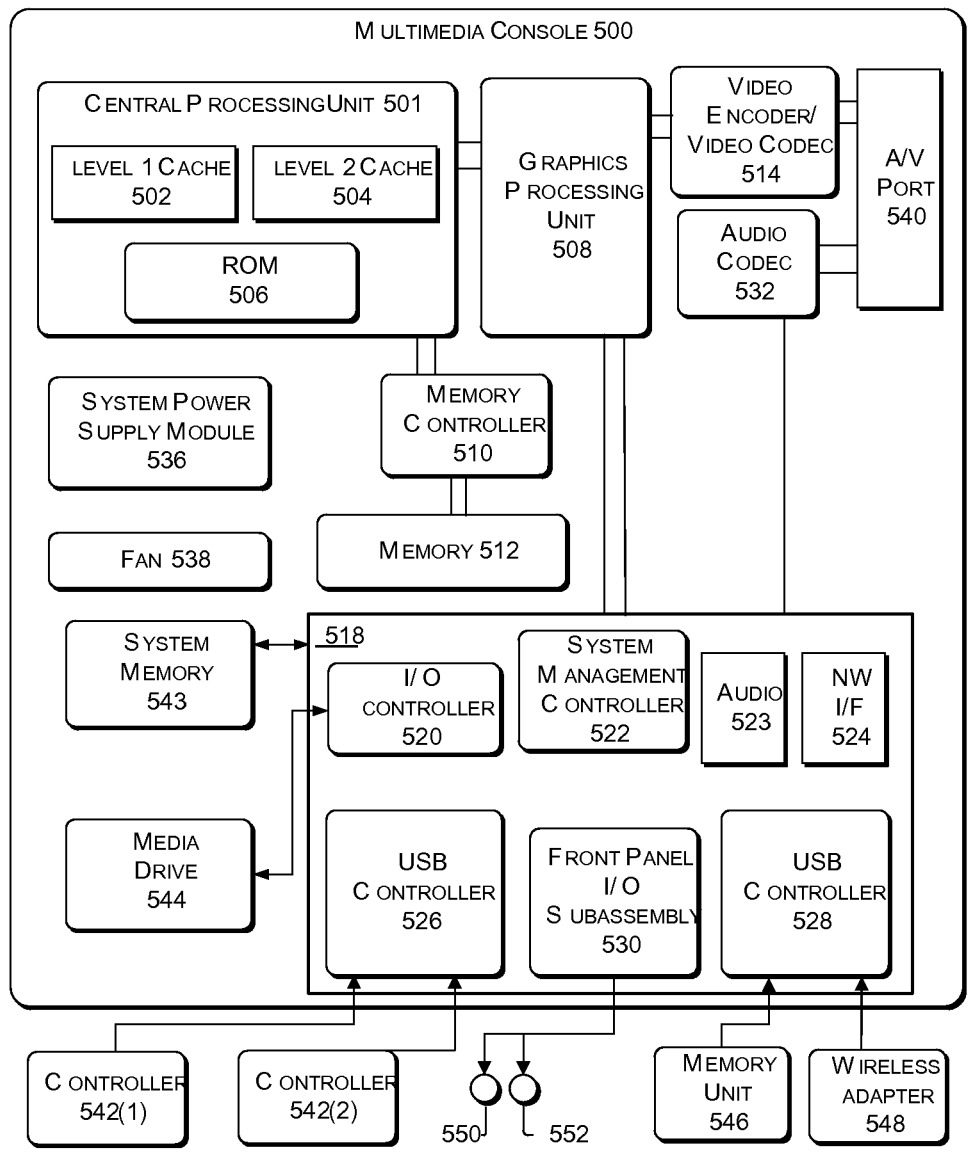
FIG. 7 is a block diagram of one embodiment of a computing system that can be used to implement the hub computing system described herein.

FIG. 7 illustrates an example embodiment of a computing system that may be used to implement hub computing system 12. As shown in FIG. 7, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 20 may define additional input devices for the console 500 via USB controller 526 or other interface. In other embodiments, hub computing system 12 can be implemented using other hardware architectures. No one hardware architecture is required.

The head mounted display device 2 and processing unit 4 (collectively referred to at times as the mobile display device) shown in FIG. 1 are in communication with one hub computing system 12 (also referred to as the hub 12). There may be one or two or more mobile display devices in communication with the hub 12 in further embodiments. Each of the mobile display devices may communicate with the hub using wireless communication, as described above. In such an embodiment, it is contemplated that much of the information that is useful to the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

In another embodiment, a system could include multiple hubs 12, with each hub including one or more mobile display devices. The hubs can communicate with each other directly or via the Internet (or other networks).

Moreover, in further embodiments, the hub 12 may be omitted altogether. One benefit of such an embodiment is that the mixed reality experience of the present system becomes completely mobile, and may be used in both indoor or outdoor settings. In such an embodiment, all functions performed by the hub 12 in the description that follows may alternatively be performed by one of the processing units 4, some of the processing units 4 working in tandem, or all of the processing units 4 working in tandem. In such an embodiment, the respective mobile display devices 580 perform all functions of system 10, including generating and updating state data, a scene map, each user's view of the scene map, all texture and rendering information, video and audio data, and other information to perform the operations described herein. The embodiments described below with respect to the flowchart of FIG. 9 include a hub 12. However, in each such embodiment, one or more of the processing units 4 may alternatively perform all described functions of the hub 12.

Using the components described above, virtual objects may be displayed to a user 18 via head mounted display device 2. Some virtual objects may be intended to remain stationary within a scene. These virtual objects are referred to herein as "static virtual objects." Other virtual objects are intended to move, or be movable, within a scene. These virtual objects are referred to as "dynamic virtual objects."

Figure 8:
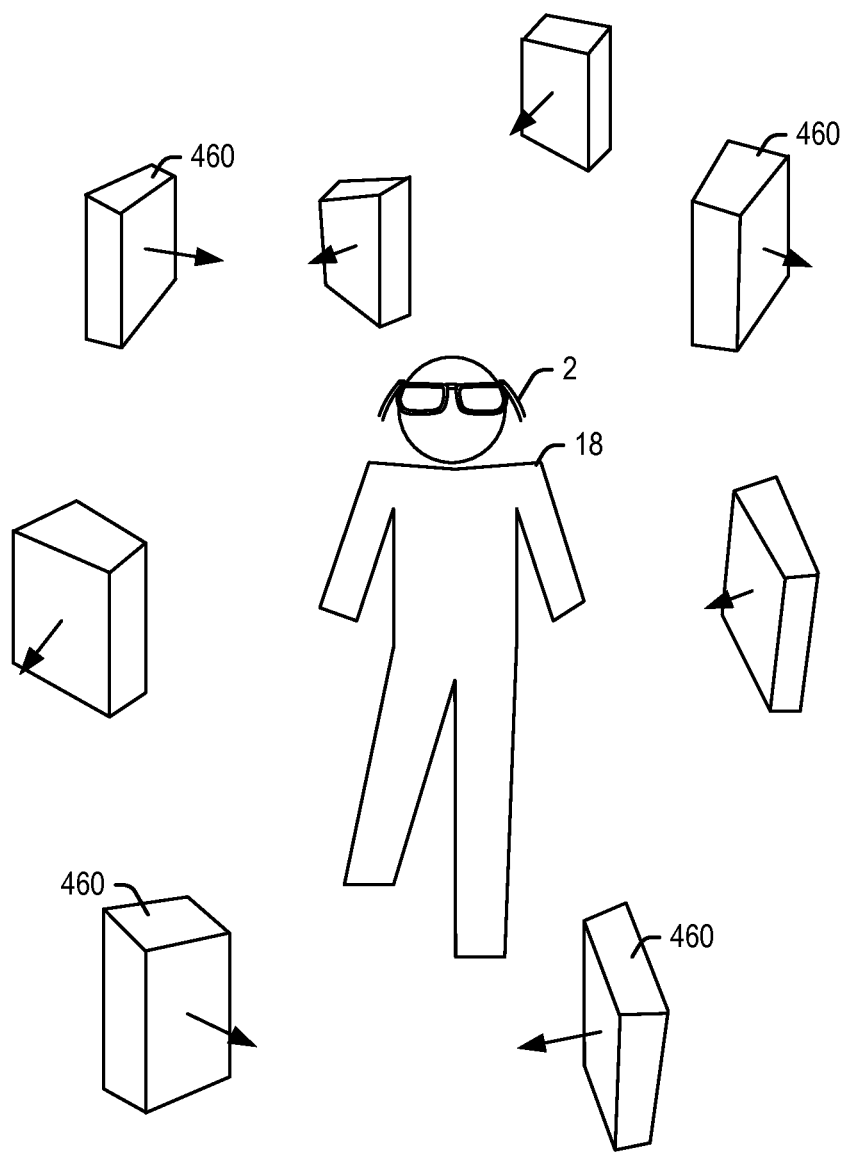
FIG. 8 is an illustration of an example of a mixed reality environment including a user moving around within a mixed reality environment.
Figure 9:
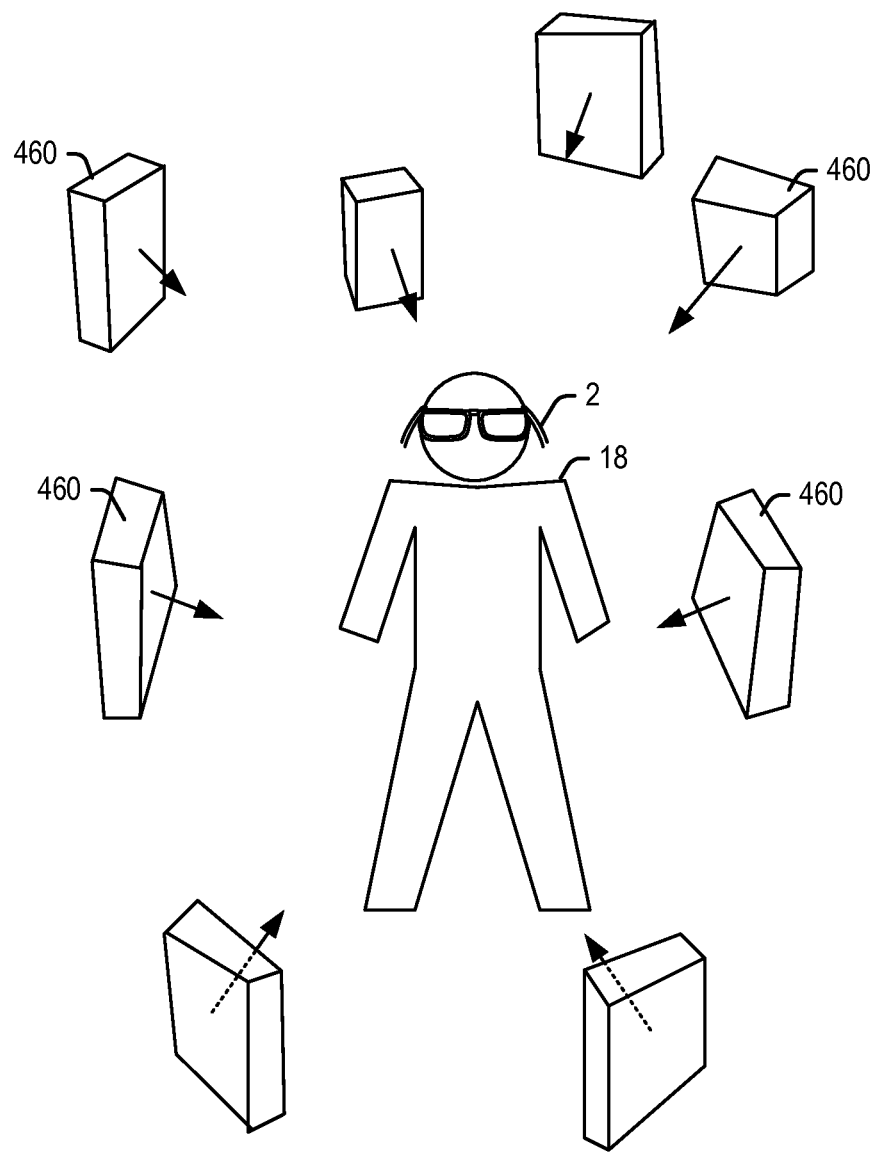
FIG. 9 is an illustration of an example of a mixed reality environment including a user standing motionless within a mixed reality environment.

An example of a dynamic virtual object is a virtual display slate 460, some of which are numbered in FIGS. 8 and 9. A virtual display slate 460 is a virtual screen displayed to the user on which content may be presented to the user. The opacity filter 114 (described above) is used to mask real world objects and light behind (from the user's view point) the virtual display slate 460, so that the virtual display slate 460 appears as a virtual screen for viewing content.

The content displayed on slate 460 may be a wide variety of content, including static content such as text and graphics, or dynamic content such as video. A slate 460 may further act as a computer monitor, so that the content may be email, web pages, games or any other content presented on a monitor. A software application running on hub 12 may generate the slate 460, as well as determine the content to be displayed on slate 460. In embodiments, the position and size of slate 460, as well as the type of content displayed on slate 460, may be user configurable through gestures and the like.

As indicated in FIG. 8, a scene may include a number of virtual objects each facing at random directions, as indicated by the arrows in FIG. 8. While the virtual objects shown in FIG. 8 are virtual display slates 460, the virtual objects may be any other dynamic or static virtual object in further embodiments. When a user is moving within a scene, the virtual objects may remain world-locked. That is, the virtual objects may remain stationary in the mixed reality environment. A user may thus move around the sides and back of virtual objects and view them from different perspectives.

However, once a user stands still or nearly still for a predetermined period of time, the dynamic virtual objects within the scene may change to being body-locked on the user 18. That is, the dynamic virtual objects may rotate about the x, y and/or z axes to face the user's body as indicated by the arrows in FIG. 9. In this way, the user may better view the front of a virtual object, and may better view the content where the virtual object is a virtual display slate. In embodiments, the present system may look for the user to be motionless (which includes a user being still or nearly still as explained below) for 1 to 5 seconds before rotating the virtual objects to face the user, though the predetermined period of time may be less than 1 second and greater than 5 seconds in further embodiments.

The virtual objects may rotate slowly and steadily toward the user. As one of many examples, a virtual object may rotate about one or more axes through 20° to 40° per second, though the rotational rate may be slower or faster than that in further examples. In embodiments, the virtual objects may rotate toward the user at a constant angular velocity, or the virtual objects may accelerate/decelerate during their rotation, for example slowing when they are nearly facing the user.

Once a user begins moving again, the virtual objects may remain in their positions from when the user was stationary, or the virtual objects may return to their positions before the user stopped moving, e.g., the positions shown in FIG. 8.

In a further embodiment, one or more of the virtual objects may rotate once the user starts moving again so as to continue to be body-locked on the user when the user is in motion. For example, when the user is stationary, the user may select one or more of the virtual objects, such as for example pointing, gazing or performing some other physical gesture with respect to the one or more virtual objects. Once selected, the virtual object may remain facing the user, even after the user begins moving again. In such embodiments, the one or more selected virtual objects may translate in addition to or instead of rotating so as to move with the user and remain a fixed distance from the user as the user moves.

In such embodiments, it is further contemplated that one or more selected virtual objects may be head-locked to the user. That is, as the user turns his head or her head, the selected virtual object(s) remain at a fixed angle and distance with respect to the user's head. It is understood that a user may manipulate selected virtual objects in a variety of other manners, such as for example moving a selected virtual object to a desired position within the mixed reality environment, resizing a virtual object or hiding a virtual object. A user may perform some physical gesture to deselect and release a selected virtual object.

Figure 10:
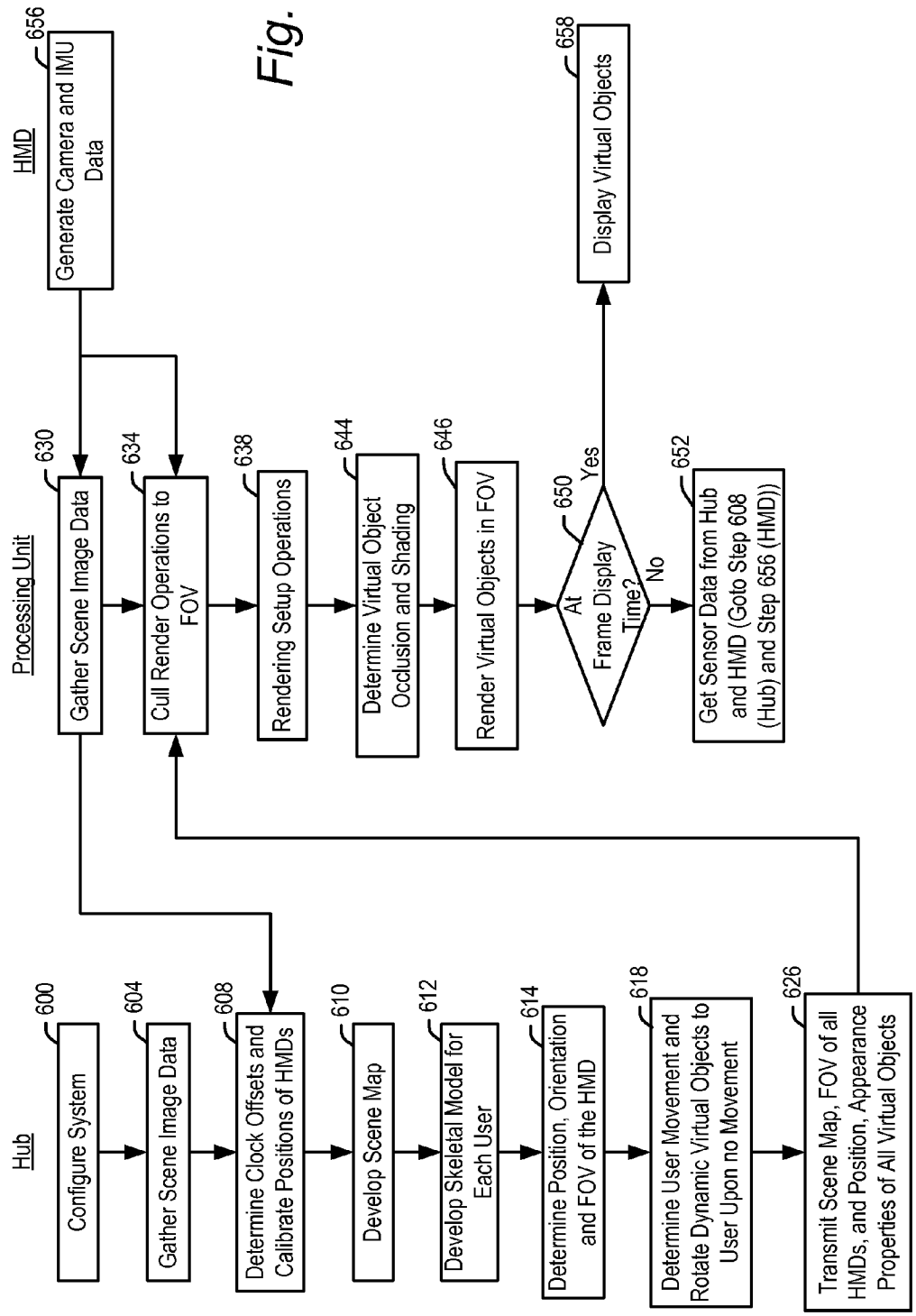
FIG. 10 is a flowchart showing the operation and collaboration of the hub computing system, one or more processing units and one or more head mounted display units of the present system.

FIG. 10 is a high level flowchart of the operation and interactivity of the hub computing system 12, the processing unit 4 and head mounted display device 2 during a discrete time period such as the time it takes to generate, render and display a single frame of image data to each user. In embodiments, data may be refreshed at a rate of 60 Hz, though it may be refreshed more often or less often in further embodiments.

In general, the system generates a scene map having x, y, z coordinates of the environment and objects in the environment such as users, real world objects and virtual objects. As noted above, the virtual object such as slate 460 may be virtually placed in the environment for example by an application running on hub computing system 12 or by user 18. The system also tracks the FOV of each user. While all users may possibly be viewing the same aspects of the scene, they are viewing them from different perspectives. Thus, the system generates each person's FOV of the scene to adjust for parallax and occlusion of virtual or real world objects, which may again be different for each user.

For a given frame of image data, a user's view may include one or more real and/or virtual objects. As a user turns his/her head, for example left to right or up and down, the relative position of real world objects in the user's FOV inherently moves within the user's FOV. For example, plant 23 in FIG. 1 may appear on the right side of a user's FOV at first. But if the user then turns his/her head toward the right, the plant 23 may eventually end up on the left side of the user's FOV.

However, the display of virtual objects to a user as the user moves his head is a more difficult problem. In an example where a user is looking at a static virtual object in his FOV, if the user moves his head left to move the FOV left, the display of the static virtual object needs to be shifted to the right by an amount of the user's FOV shift, so that the net effect is that the static virtual object remains stationary within the FOV. A system for properly displaying static and dynamic virtual objects is explained below with respect to the flowchart of FIGS. 10-14.

The system for presenting mixed reality to one or more users 18 may be configured in step 600. For example, a user 18 or operator of the system may specify the virtual objects that are to be presented, whether they are to be static or dynamic virtual objects, and how, when and where they are to be presented. In an alternative embodiment, an application running on hub 12 and/or processing unit 4 can configure the system as to the static and/or dynamic virtual objects that are to be presented.

In one example, the application may select one or more static and/or dynamic virtual objects for presentation in default locations within the scene. Alternatively or additionally, the user may select one or more predefined static and/or dynamic virtual objects for inclusion in the scene. Whether selected by the application or user, the user may thereafter have the option to change the default position of one or more of the dynamic virtual objects. For example, the user may select a virtual display slate 460 for positioning at the center or near center of his FOV. Alternatively, a user may send a virtual display slate 460 onto a wall. These options may for example be carried out by the user performing grabbing and moving gestures with his or her hands, though it may be carried out in other ways in further embodiments.

In steps 604 and 630, hub 12 and processing unit 4 gather data from the scene. For the hub 12, this may be image and audio data sensed by the depth camera 426, RGB camera 428 and microphone 430 of capture device 20. For the processing unit 4, this may be image data sensed in step 656 by the head mounted display device 2, and in particular, by the cameras 112, the eye tracking assemblies 134 and the IMU 132. The data gathered by the head mounted display device 2 is sent to the processing unit 4 in step 656. The processing unit 4 processes this data, as well as sending it to the hub 12 in step 630.

In step 608, the hub 12 performs various setup operations that allow the hub 12 to coordinate the image data of its capture device 20 and the one or more processing units 4. In particular, even if the position of the capture device 20 is known with respect to a scene (which it may not be), the cameras on the head mounted display devices 2 are moving around in the scene. Therefore, in embodiments, the positions and time capture of each of the imaging cameras need to be calibrated to the scene, each other and the hub 12. Further details of step 608 are now described with reference to the flowchart of FIG. 11.

One operation of step 608 includes determining clock offsets of the various imaging devices in the system 10 in a step 670. In particular, in order to coordinate the image data from each of the cameras in the system, it may be confirmed that the image data being coordinated is from the same time. In general, the image data from capture device 20 and the image data coming in from the one or more processing units 4 are time stamped off a single master clock in hub 12. Using the time stamps for all such data for a given frame, as well as the known resolution for each of the cameras, the hub 12 determines the time offsets for each of the imaging cameras in the system. From this, the hub 12 may determine the differences between, and an adjustment to, the images received from each camera.

The hub 12 may select a reference time stamp from one of the cameras' received frame. The hub 12 may then add time to or subtract time from the received image data from all other cameras to synch to the reference time stamp. It is appreciated that a variety of other operations may be used for determining time offsets and/or synchronizing the different cameras together for the calibration process. The determination of time offsets may be performed once, upon initial receipt of image data from all the cameras. Alternatively, it may be performed periodically, such as for example each frame or some number of frames.

Step 608 further includes the operation of calibrating the positions of all cameras with respect to each other in the x, y, z Cartesian space of the scene. Once this information is known, the hub 12 and/or the one or more processing units 4 is able to form a scene map or model identify the geometry of the scene and the geometry and positions of objects (including users) within the scene. In calibrating the image data of all cameras to each other, depth and/or RGB data may be used.

The imaging cameras in system 10 may each have some lens distortion which needs to be corrected for in order to calibrate the images from different cameras. Once all image data from the various cameras in the system is received in steps 604 and 630, the image data may be adjusted to account for lens distortion for the various cameras in step 674. The distortion of a given camera (depth or RGB) may be a known property provided by the camera manufacturer. If not, algorithms are known for calculating a camera's distortion, including for example imaging an object of known dimensions such as a checker board pattern at different locations within a camera's FOV. The deviations in the camera view coordinates of points in that image will be the result of camera lens distortion. Once the degree of lens distortion is known, distortion may be corrected by known inverse matrix transformations that result in a uniform camera view map of points in a point cloud for a given camera.

The hub 12 may next translate the distortion-corrected image data points captured by each camera from the camera view to an orthogonal 3-D world view in step 678. This orthogonal 3-D world view is a point cloud map of all image data captured by capture device 20 and the head mounted display device cameras in an orthogonal x, y, z Cartesian coordinate system. The matrix transformation equations for translating camera view to an orthogonal 3-D world view are known.

Each camera in system 10 may construct an orthogonal 3-D world view in step 678. The x, y, z world coordinates of data points from a given camera are still from the perspective of that camera at the conclusion of step 678, and not yet correlated to the x, y, z world coordinates of data points from other cameras in the system 10. The next step is to translate the various orthogonal 3-D world views of the different cameras into a single overall 3-D world view shared by all cameras in system 10.

To accomplish this, embodiments of the hub 12 may next look for key-point discontinuities, or cues, in the point clouds of the world views of the respective cameras in step 682, and then identifies cues that are the same between different point clouds of different cameras in step 684. Once the hub 12 is able to determine that two world views of two different cameras include the same cues, the hub 12 is able to determine the position, orientation and focal length of the two cameras with respect to each other and the cues in step 688. In embodiments, not all cameras in system 10 will share the same common cues. However, as long as a first and second camera have shared cues, and at least one of those cameras has a shared view with a third camera, the hub 12 is able to determine the positions, orientations and focal lengths of the first, second and third cameras relative to each other and a single, overall 3-D world view. The same is true for additional cameras in the system.

Various known algorithms exist for identifying cues from an image point cloud. A further method of detecting cues with image data is the Scale-Invariant Feature Transform (SIFT) algorithm. Another cue detector method is the Maximally Stable Extremal Regions (MSER) algorithm.

In step 684, cues which are shared between point clouds from two or more cameras are identified. Conceptually, where a first set of vectors exist between a first camera and a set of cues in the first camera's Cartesian coordinate system, and a second set of vectors exist between a second camera and that same set of cues in the second camera's Cartesian coordinate system, the two systems may be resolved with respect to each other into a single Cartesian coordinate system including both cameras. A number of known techniques exist for finding shared cues between point clouds from two or more cameras.

Where the point clouds from two different cameras share a large enough number of matched cues, a matrix correlating the two point clouds together may be estimated, for example by Random Sampling Consensus (RANSAC), or a variety of other estimation techniques. Matches that are outliers to the recovered fundamental matrix may then be removed. After finding a set of assumed, geometrically consistent matches between a pair of point clouds, the matches may be organized into a set of tracks for the respective point clouds, where a track is a set of mutually matching cues between point clouds. A first track in the set may contain a projection of each common cue in the first point cloud. A second track in the set may contain a projection of each common cue in the second point cloud. The point clouds from different cameras may then be resolved into a single point cloud in a single orthogonal 3-D real world view.

The positions and orientations of all cameras are calibrated with respect to this single point cloud and single orthogonal 3-D real world view. In order to resolve the various point clouds together, the projections of the cues in the set of tracks for two point clouds are analyzed. From these projections, the hub 12 can determine the perspective of a first camera with respect to the cues, and can also determine the perspective of a second camera with respect to the cues. From that, the hub 12 can resolve the point clouds into an estimate of a single point cloud and single orthogonal 3-D real world view containing the cues and other data points from both point clouds.

This process is repeated for any other cameras, until the single orthogonal 3-D real world view includes all cameras. Once this is done, the hub 12 can determine the relative positions and orientations of the cameras relative to the single orthogonal 3-D real world view and each other. The hub 12 can further determine the focal length of each camera with respect to the single orthogonal 3-D real world view.

Referring again to FIG. 10, once the system is calibrated in step 608, a scene map may be developed in step 610 identifying the geometry of the scene as well as the geometry and positions of objects within the scene. In embodiments, the scene map generated in a given frame may include the x, y and z positions of all users, real world objects and virtual objects in the scene. All of this information is obtained during the image data gathering steps 604, 630 and 656 and is calibrated together in step 608.

At least the capture device 20 includes a depth camera for determining the depth of the scene (to the extent it may be bounded by walls, etc.) as well as the depth position of objects within the scene. As explained below, the scene map is used in positioning virtual objects within the scene, as well as displaying virtual three-dimensional objects with the proper occlusion (a virtual three-dimensional object may be occluded, or a virtual three-dimensional object may occlude, a real world object or another virtual three-dimensional object).

The system 10 may include multiple depth image cameras to obtain all of the depth images from a scene, or a single depth image camera, such as for example depth image camera 426 of capture device 20 may be sufficient to capture all depth images from a scene. An analogous method for determining a scene map within an unknown environment is known as simultaneous localization and mapping (SLAM).

In step 612, the system will detect and track moving objects such as humans moving in the room, and update the scene map based on the positions of moving objects. This includes the use of skeletal models of the users within the scene as described above.

In step 614, the hub determines the x, y and z position, the orientation and the FOV of the head mounted display device 2. Further details of step 614 are now described with respect to the flowchart of FIG. 12. The steps of FIG. 12 are described below with respect to a single user. However, the steps of FIG. 12 would be carried out for each user within the scene.

In step 700, the calibrated image data for the scene is analyzed at the hub to determine both the user head position and a face unit vector looking straight out from a user's face. The head position is identified in the skeletal model. The face unit vector may be determined by defining a plane of the user's face from the skeletal model, and taking a vector perpendicular to that plane. This plane may be identified by determining a position of a user's eyes, nose, mouth, ears or other facial features. The face unit vector may be used to define the user's head orientation and, in examples, may be considered the center of the FOV for the user. The face unit vector may also or alternatively be identified from the camera image data returned from the cameras 112 on head mounted display device 2. In particular, based on what the cameras 112 on head mounted display device 2 see, the associated processing unit 4 and/or hub 12 is able to determine the face unit vector representing a user's head orientation.

In step 704, the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, also referred to as "ground truth," may be provided from the image data obtained from capture device 20, the cameras on the head mounted display device 2 for the subject user and/or from the head mounted display device(s) 2 of other users.

In embodiments, the position and orientation of a user's head may be determined by steps 700 and 704 acting in tandem. In further embodiments, one or the other of steps 700 and 704 may be used to determine head position and orientation of a user's head.

It may happen that a user is not looking straight ahead. Therefore, in addition to identifying user head position and orientation, the hub may further consider the position of the user's eyes in his head in step 706. This information may be provided by the eye tracking assembly 134 described above. The eye tracking assembly is able to identify a position of the user's eyes, which can be represented as an eye unit vector showing the left, right, up and/or down deviation from a position where the user's eyes are centered and looking straight ahead (i.e., the face unit vector). A face unit vector may be adjusted to the eye unit vector to define where the user is looking.

In step 710, the FOV of the user may next be determined. The range of view of a user of a head mounted display device 2 may be predefined based on the up, down, left and right peripheral vision of a hypothetical user. In order to ensure that the FOV calculated for a given user includes objects that a particular user may be able to see at the extents of the FOV, this hypothetical user may be taken as one having a maximum possible peripheral vision. Some predetermined extra FOV may be added to this to ensure that enough data is captured for a given user in embodiments.

The FOV for the user at a given instant may then be calculated by taking the range of view and centering it around the face unit vector, adjusted by any deviation of the eye unit vector. In addition to defining what a user is looking at in a given instant, this determination of a user's FOV is also useful for determining what a user cannot see. As explained below, limiting processing of virtual objects to those areas that a particular user can see improves processing speed and reduces latency.

In the embodiment described above, the hub 12 calculates the FOV of the one or more users in the scene. In further embodiments, the processing unit 4 for a user may share in this task. For example, once user head position and eye orientation are estimated, this information may be sent to the processing unit which can update the position, orientation, etc. based on more recent data as to head position (from IMU 132) and eye position (from eye tracking assembly 134).

Returning now to FIG. 10, an application running on hub 12, or one or more of the users 18, may have placed static and/or dynamic virtual objects in the scene. These virtual objects may be facing any of various directions as a user moves around within the mixed reality environment, but once a user stops moving for a predetermined period of time, the one or more virtual objects around the user may rotate toward the user. In step 618, the hub may use the scene map, and a determination of whether the user is moving or standing still, to adjust the x, y and z positions (including orientations) of all such static and dynamic virtual objects at the current time. Alternatively, this information may be generated by one or more of the processing units 4 and sent to the hub 12 in step 618.

Further details of step 618 are now described with reference to the flowchart of FIG. 13. In step 714, the hub 12 determines whether the user is motionless for a predetermined period of time. In particular, the hub 12, either by itself or in conjunction with sensors in head mounted display 2, is able to determine changes in body movement. Once it is initially determined that a user is motionless, a counter may start which increments from frame to frame until it is determined that the user has been motionless for the predetermined period of time. While the counter is incrementing, if the user begins moving, the time counter can reset to zero, and not begin again until it is determined that the user is motionless in a future frame.

While "motionless" can be a user standing or sitting perfectly still, the term "motionless" as used herein can include some degree of motion. For example, a user may be motionless where he or she is standing with at least his/her feet motionless, but with one or more portions of the body above the feet (knees, hips upper body, head, etc.) moving. "Motionless" as used herein can mean a user sitting, but with portions of a user's legs, upper body or head moving. "Motionless" as used herein can mean the user is moving, but not outside of a small diameter, for example 3 feet, centered around the user after the user has come to a stop. In this example, a user can for example be turning around within the diameter (e.g., to view virtual objects behind him/her) and still be considered "motionless."

The term "motionless" can also refer to a user that has moved less than a predetermined amount within a predefined period of time. As one of many examples, a user may be considered motionless when he has moved less than 3 feet in any direction within a 5 second period. As noted, this is by way of example only and the amount of movement and the period of time over which this amount of movement is detected may both vary in further examples. When referring to a user's head as being motionless, that may include a user's head being still or having limited movement over a predetermined period of time. In one example, a user's head may be considered motionless if it pivots less than 45° about any axis within a 5 second period. Again, this is by way of example only and may vary. The head mounted display device 2 may determine that a user is "motionless" when the user's movement conforms at least to any of the above-identified movements.

If a user is moving through the scene upon execution of step 714, or is not motionless for the predetermined period of time, the hub can perform step 716 of maintaining virtual objects as world-locked objects. As noted, in embodiments, the predetermined period of time may be between 1 and 5 seconds, though this period of time may be longer or shorter than that in further embodiments.

If a user is determined to be motionless for the predetermined period of time in step 714, the hub may check whether one or more virtual objects are static or dynamic in step 720. If one or more virtual objects are determined to be static, those objects remain world-locked in step 716. Where dynamic virtual objects are virtual display slates as described above, these objects have a clear front facing surface, i.e., the surface displaying content. However, as noted, there may be dynamic virtual objects other than virtual display slates. These other dynamic virtual objects may have a defined front, which rotates toward the user as explained below. Where a dynamic virtual object does not have a defined front, those virtual objects may also remain world-locked in step 716.

On the other hand, if one or more virtual objects are determined to be dynamic and have a defined front, they may rotate to face the user as explained below with respect to steps 722-736. The dynamic virtual objects which rotate toward the user in steps 722-736 may be all of the dynamic virtual objects in the scene, or just those dynamic virtual objects within a predetermined radius of the user.

In step 722, position vectors may be determined between each dynamic virtual object having a front and the user. In step 726, the front of each dynamic virtual object may be rotated about x, y and/or z axes toward its position vector at a predetermined angular velocity. This rotation will continue each time through the loop of the steps shown in FIG. 10, until an object is x, y and z aligned with its position vector or until a user is determined to be moving (i.e., not "motionless" as that term is used herein). It is noted that, given the angular velocities contemplated herein with which virtual objects rotate toward the user, the amount of rotation will be small for each given frame.

In step 728, the hub calculates the new position and appearance of virtual objects in three-dimensional space. In step 732, the hub may check whether an updated virtual object occupies the same space as another virtual object or a real world object in the scene. In particular, positions of real world objects may be identified in three dimensional space, and positions of the updated virtual object may also be known in three dimensional space. If there is any overlap in step 732, the hub 12 may adjust the position of the virtual object(s) in step 736 according to default rules or metrics defined in the application. If there is no overlap, the hub may next perform step 626 in FIG. 10.

Figure 13:
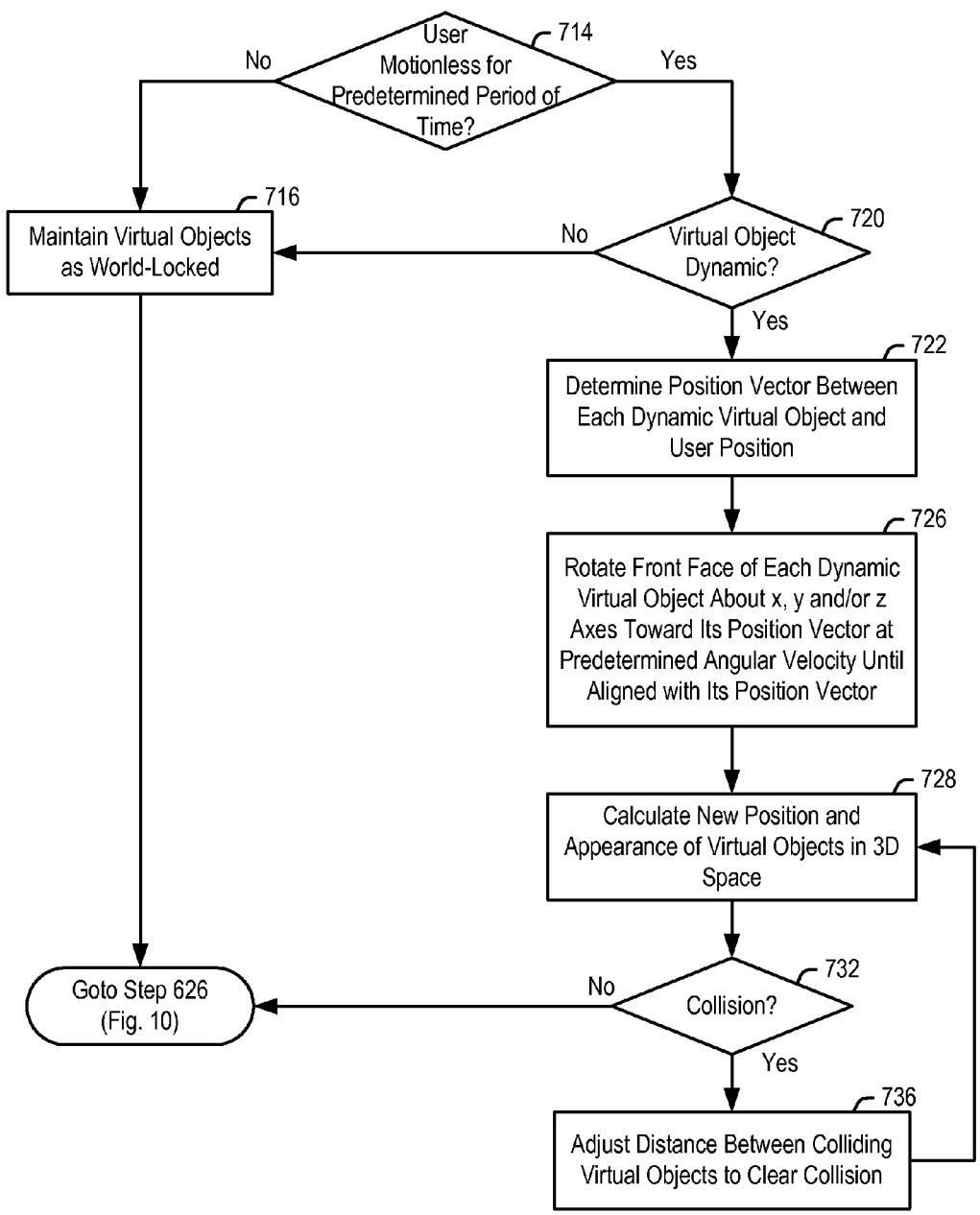

Using the steps of FIG. 13, dynamic virtual objects may remain world-locked as a user moves through the mixed reality environment as shown in FIG. 8, and then may rotate toward the user once a user remains motionless for a predetermined period of time as shown in FIG. 9. Once a user begins moving again, the rotated virtual objects may stay in their rotated positions, or may they may rotate back to their positions prior to rotating toward the user, As noted above, a user may select one or more virtual objects, for example while the virtual objects are rotated toward the user. Selection of one or more dynamic virtual objects may be indicated by any of several gestures, such as for example the user having pointed at one or more dynamic virtual objects in the current or previous frames. Alternatively or additionally, the hub 12 may determine that the user's gaze is fixed on one or more virtual objects in the current or previous frames. Selected virtual objects may for example stay rotated and at a fixed distance from a user even after a user begins moving around again within the scene. Once selected, the one or more dynamic virtual objects may remain selected, until the user performs another gesture indicating de-selection of one or more dynamic virtual objects. A de-selection gesture may for example be a physical hand gesture or the user looking away from the one or more dynamic virtual objects for a predetermined period of time.

The user may also grab and move one or more dynamic virtual objects from their default positions to new positions in the FOV. These new positions may be set as the new default positions, or the positions may revert back to the former default positions after the user de-selects the dynamic virtual object.

Once the positions of both static and dynamic virtual objects are set as described in FIG. 13, the hub 12 may transmit the determined information to the one or more processing units 4 in step 626 (FIG. 10). The information transmitted in step 626 includes transmission of the scene map to the processing units 4 of all users. The transmitted information may further include transmission of the determined FOV of each head mounted display device 2 to the processing units 4 of the respective head mounted display devices 2. The transmitted information may further include transmission of static and dynamic virtual object characteristics, including the determined position, orientation, shape and appearance.

The processing steps 600 through 626 are described above by way of example only. It is understood that one or more of these steps may be omitted in further embodiments, the steps may be performed in differing order, or additional steps may be added. The processing steps 604 through 618 may be computationally expensive but the powerful hub 12 may perform these steps several times in a 60 Hertz frame. In further embodiments, one or more of the steps 604 through 618 may alternatively or additionally be performed by one or more of the one or more processing units 4. Moreover, while FIG. 10 shows determination of various parameters, and then transmission of these parameters all at once in step 626, it is understood that determined parameters may be sent to the processing unit(s) 4 asynchronously as soon as they are determined.

The operation of the processing unit 4 and head mounted display device 2 will now be explained with reference to steps 630 through 656. The following description is of a single processing unit 4 and head mounted display device 2. However, the following description may apply to each processing unit 4 and display device 2 in the system.

As noted above, in an initial step 656, the head mounted display device 2 generates image and IMU data, which is sent to the hub 12 via the processing unit 4 in step 630. While the hub 12 is processing the image data, the processing unit 4 is also processing the image data, as well as performing steps in preparation for rendering an image.

In step 634, the processing unit 4 may cull the rendering operations so that only those virtual objects which could possibly appear within the final FOV of the head mounted display device 2 are rendered. The positions of other virtual objects may still be tracked, but they are not rendered. It is also conceivable that, in further embodiments, step 634 may be skipped altogether and the whole image is rendered.

The processing unit 4 may next perform a rendering setup step 638 where setup rendering operations are performed using the scene map and FOV received in step 626. Once virtual object data is received, the processing unit may perform rendering setup operations in step 638 for the virtual objects which are to be rendered in the FOV. The setup rendering operations in step 638 may include common rendering tasks associated with the virtual object(s) to be displayed in the final FOV. These rendering tasks may include for example, shadow map generation, lighting, and animation. In embodiments, the rendering setup step 638 may further include a compilation of likely draw information such as vertex buffers, textures and states for virtual objects to be displayed in the predicted final FOV.

Referring again to FIG. 10, using the information received from the hub 12 in step 626, the processing unit 4 may next determine occlusions and shading in the user's FOV in step 644. In particular, the screen map has x, y and z positions of all objects in the scene, including moving and non-moving objects and the virtual objects. Knowing the location of a user and their line of sight to objects in the FOV, the processing unit 4 may then determine whether a virtual object partially or fully occludes the user's view of a real world object. Additionally, the processing unit 4 may determine whether a real world object partially or fully occludes the user's view of a virtual object. Occlusions are user-specific. A virtual object may block or be blocked in the view of a first user, but not a second user. Accordingly, occlusion determinations may be performed in the processing unit 4 of each user. However, it is understood that occlusion determinations may additionally or alternatively be performed by the hub 12.

In the context of the present technology, the processing unit 4 checks in step 644 whether a repositioned dynamic virtual object such as a slate 460 occludes or is occluded by another object. As noted above and explained below, the opacity filter 114 allows slate 460 to be displayed while blocking light from virtual and real world object that appear behind the slate 460 (from the user's point of view). The slate 460 may be occluded by object appearing closer to the user that slate 460. In that case, the user may do nothing (and leave the slate 460 occluded), or the user may reposition the slate 460 in front of the occluding object. In this instance, the slate 460 may be made smaller to maintain the same perspective of the slate 460 to the user.

Figure 14:
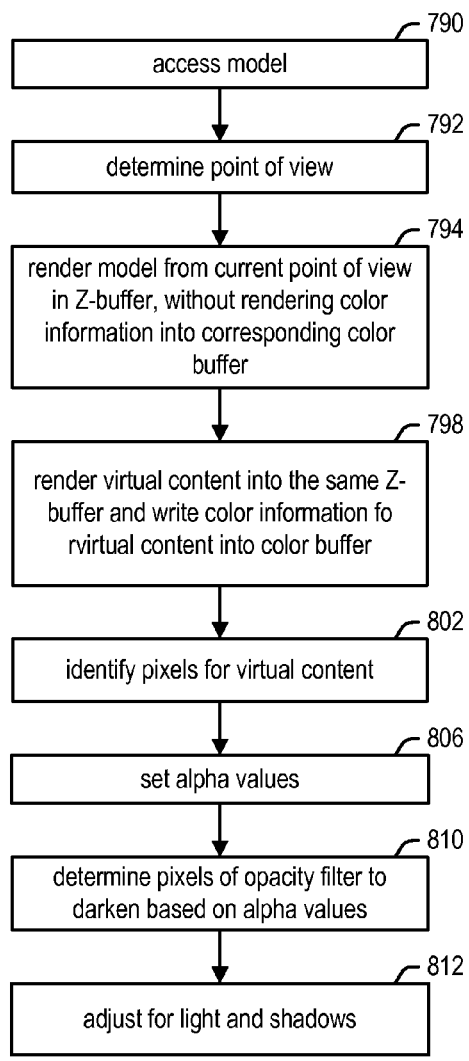
Figure 14A:
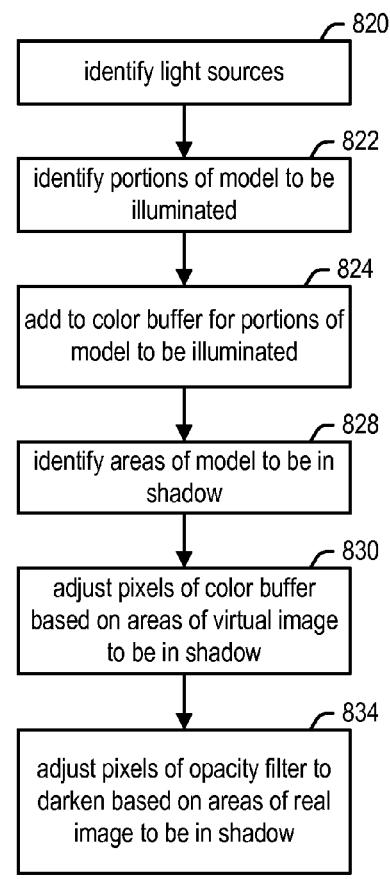

In step 646, the GPU 322 of processing unit 4 may next render an image to be displayed to the user. Portions of the rendering operations may have already been performed in the rendering setup step 638 and periodically updated. Further details of the rendering step 646 are now described with reference to the flowchart of FIGS. 14 and 14A. FIGS. 14 and 14A are described with respect to an example of rendering a virtual display slate 460, though the following steps apply to rending all virtual objects, both static and dynamic.

In step 790 of FIG. 14, the processing unit 4 accesses the model of the environment. In step 792, the processing unit 4 determines the point of view of the user with respect to the model of the environment. That is, the system determines what portion of the environment or space the user is looking at. In one embodiment, step 792 is a collaborative effort using hub computing device 12, processing unit 4 and head mounted display device 2 as described above.

In one embodiment, the processing unit 4 will attempt to add one or more virtual display slates 460 into a scene. In step 794, the system renders the previously created three dimensional model of the environment from the point of view of the user of head mounted display device 2 in a z-buffer, without rendering any color information into the corresponding color buffer. This effectively leaves the rendered image of the environment to be all black, but does store the z (depth) data for the objects in the environment. Step 794 results in a depth value being stored for each pixel (or for a subset of pixels).

In step 798, virtual content (e.g., virtual images corresponding to the virtual display slates 460) is rendered into the same z-buffer and the color information for the virtual content is written into the corresponding color buffer. This effectively allows the virtual display slates 460 to be drawn on the headset microdisplay 120 taking into account real world objects or other virtual objects occluding all or part of a virtual display slate.

In step 802, the system identifies the pixels of microdisplay 120 that display virtual display slates. In step 806, alpha values are determined for the pixels of microdisplay 120. In traditional chroma key systems, the alpha value is used to identify how opaque an image is, on a pixel-by-pixel basis. In some applications, the alpha value can be binary (e.g., on or off). In other applications, the alpha value can be a number with a range. In one example, each pixel identified in step 802 will have a first alpha value and all other pixels will have a second alpha value.

In step 810, the pixels for the opacity filter 114 are determined based on the alpha values. In one example, the opacity filter 114 has the same resolution as microdisplay 120 and, therefore, the opacity filter can be controlled using the alpha values. In another embodiment, the opacity filter has a different resolution than microdisplay 120 and, therefore, the data used to darken or not darken the opacity filter will be derived from the alpha value by using any of various mathematical algorithms for converting between resolutions. Other means for deriving the control data for the opacity filter based on the alpha values (or other data) can also be used.

In step 812, the images in the z-buffer and color buffer, as well as the alpha values and the control data for the opacity filter, are adjusted to account for light sources (virtual or real) and shadows (virtual or real). More details of step 812 are provided below with respect to FIG. 14A. The process of FIG. 14 allows for automatically displaying a virtual display slate 460 over a stationary or moving object (or in relation to a stationary or moving object) on a display that allows actual direct viewing of at least a portion of the space through the display.

FIG. 14A is a flowchart describing one embodiment of a process for accounting for light sources and shadows, which is an example implementation of step 812 of FIG. 14. In step 820, processing unit 4 identifies one or more light sources that need to be accounted for. For example, a real light source may need to be accounted for when drawing a virtual image. If the system is adding a virtual light source to the user's view, then the effect of that virtual light source can be accounted for in the head mounted display device 2 as well. In step 822, the portions of the model (including virtual objects) that are illuminated by the light source are identified. In step 824, an image depicting the illumination is added to the color buffer described above.

In step 828, processing unit 4 identifies one or more areas of shadow that need to be added by the head mounted display device 2. For example, if a virtual object is added to an area in a shadow, then the shadow needs to be accounted for when drawing the virtual object by adjusting the color buffer in step 830. If a virtual shadow is to be added where there is no virtual object, then the pixels of opacity filter 114 that correspond to the location of the virtual shadow are darkened in step 834.

Returning to FIG. 10, in step 650, the processing unit checks whether it is time to send a rendered image to the head mounted display device 2, or whether there is still time for further refinement of the image using more recent position feedback data from the hub 12 and/or head mounted display device 2. In a system using a 60 Hertz frame refresh rate, a single frame is about 16 ms.

In particular, the composite image based on the z-buffer and color buffer (described above with respect to FIGS. 14 and 14A) is sent to microdisplay 120. That is, the images for the one or more virtual display slates 460 are sent to microdisplay 120 to be displayed at the appropriate pixels, accounting for perspective and occlusions. At this time, the control data for the opacity filter is also transmitted from processing unit 4 to head mounted display device 2 to control opacity filter 114. The head mounted display would then display the image to the user in step 658.

On the other hand, where it is not yet time to send a frame of image data to be displayed in step 650, the processing unit may loop back for more updated data to further refine the predictions of the final FOV and the final positions of objects in the FOV. In particular, if there is still time in step 650, the processing unit 4 may return to step 608 to get more recent sensor data from the hub 12, and may return to step 656 to get more recent sensor data from the head mounted display device 2.

The processing steps 630 through 652 are described above by way of example only. It is understood that one or more of these steps may be omitted in further embodiments, the steps may be performed in differing order, or additional steps may be added.

Moreover, the flowchart of the processor unit steps in FIG. 10 shows all data from the hub 12 and head mounted display device 2 being cyclically provided to the processing unit 4 at the single step 634. However, it is understood that the processing unit 4 may receive data updates from the different sensors of the hub 12 and head mounted display device 2 asynchronously at different times. The head mounted display device 2 provides image data from cameras 112 and inertial data from IMU 132. Sampling of data from these sensors may occur at different rates and may be sent to the processing unit 4 at different times. Similarly, processed data from the hub 12 may be sent to the processing unit 4 at a time and with a periodicity that is different than data from both the cameras 112 and IMU 132. In general, the processing unit 4 may asynchronously receive updated data multiple times from the hub 12 and head mounted display device 2 during a frame. As the processing unit cycles through its steps, it uses the most recent data it has received when extrapolating the final predictions of FOV and object positions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A system for presenting a mixed reality experience to one or more users, the system comprising:
    one or more display devices for the one or more users, each display device including a display unit for displaying a virtual object to the user of the display device; and
    a computing system operatively coupled to the one or more display devices, the computing system generating the virtual object for display on the one or more display devices, the computing system displaying the virtual object to a user of the one or more users at a first position when the user is moving, and the computing system displaying the virtual object to the user at a second position rotated to face the user when the user is motionless, movement of the virtual object from the first position to the second position triggered by the user ceasing motion.

2. The system of claim 1, wherein the computing system comprises at least one of a hub computing system and one or more processing units.

3. The system of claim 1, wherein the computing system displays the virtual object as rotating between the first and second positions at a predetermined angular velocity.

4. The system of claim 1, wherein the computing system displays the virtual object as rotating between the first and second positions upon the user being motionless for a predetermined period of time.

5. The system of claim 1, wherein the user is motionless and computing system displays the virtual object at the second position when the user's head is categorized as being motionless.

6. The system of claim 1, wherein the user is motionless and computing system displays the virtual object at the second position when the user is sitting down.

7. The system of claim 1, wherein the user is motionless and computing system displays the virtual object at the second position when the user is confined to moving within a small diameter for a predetermined period of time.

8. The system of claim 1, wherein the virtual object is a virtual display slate.

9. The system of claim 1, wherein the computing system allows a user to select a virtual object, and move the virtual object to a new position in three dimensional space with a gesture.

10. The system of claim 9, wherein the virtual object is selected by the user performing a gesture with the user's hands, body or eyes.

11. A system for presenting a mixed reality experience to a user, the system comprising:
    a display device for the user, the display device including a first set of sensors for sensing data relating to a position of the display device and a display unit for displaying a virtual object to the user of the display device; and
    a computing system operatively coupled to the display device, the computing system including a second set of sensors for sensing data relating to a position of the user, and the computing system generating the virtual object for display on the display device, the computing system displaying the virtual object to the user as rotating to face the user's body when the user changes their movement from being in motion to being motionless for a predetermined period of time.

12. The system of claim 11, wherein the virtual object is a dynamic virtual object, the computing system displaying a second virtual object that is a static virtual object, the computing system displaying the static virtual object to the user as remaining world-locked and not rotating to face the user when the user changes their movement from being in motion to being motionless for a predetermined period of time.

13. The system of claim 11, wherein the computer system displays a plurality of virtual objects to the user, all of the plurality of virtual objects being displayed as rotating toward the user when the user changes their movement from being in motion to being motionless for a predetermined period of time.

14. The system of claim 11, wherein the computer system displays a plurality of virtual objects to the user, a subset of the plurality of virtual objects within a predefined radius being displayed as rotating toward the user when the user changes their movement from being in motion to being motionless for a predetermined period of time, the plurality of virtual objects outside of the subset displayed to the user as world-locked and not rotating to face the user.

15. The system of claim 11, wherein the virtual object is a virtual display slate.

16. The system of claim 11, wherein the computing system displays at least one of one of static and dynamic images on the virtual display slate.

17. A method of presenting a mixed reality experience to one or more users, the method comprising:
    (a) displaying a virtual object to the user at a first position in the user's field of view as a user moves with respect to the virtual object; and
    (b) displaying the virtual object as rotating from the first position to a second position to face the user when the user remains motionless for a predetermined period of time.

18. The method of claim 17, the virtual object comprising a dynamic virtual object, the method further comprising:
    (c) displaying a static virtual object to the user at a position in the user's field of view when it is determined that the user is moving with respect to the virtual object; and
    (d) maintaining the static virtual object in a stationary world-locked position when it is determined that the user is motionless for the predetermined period of time.

19. The method of claim 17, wherein the virtual object rotates back to the first position upon the user moving again.

20. The method of claim 17, wherein the virtual object stays in the second position upon the user moving again.

* * * * *